Figure 1:
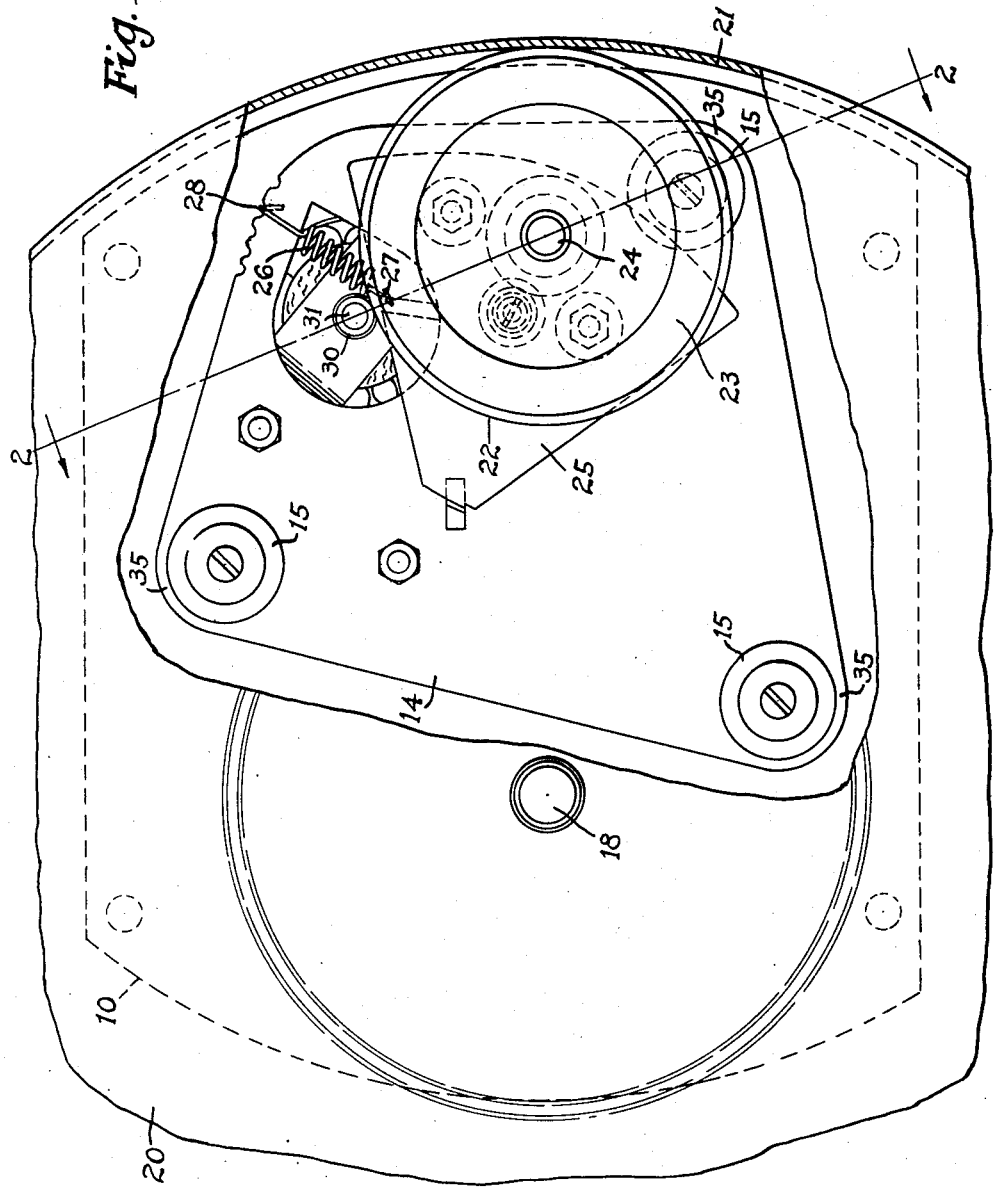

Dec. 14, 1948.  E. V. SCHNEIDER  2,456,087
RUBBER GROMMET

Filed Nov. 15, 1944  2 Sheets-Sheet 1

Inventor

*Emmor V. Schneider*

By *Frease and Bishop*

Attorneys

Dec. 14, 1948. E. V. SCHNEIDER 2,456,087
RUBBER GROMMET
Filed Nov. 15, 1944 2 Sheets-Sheet 2
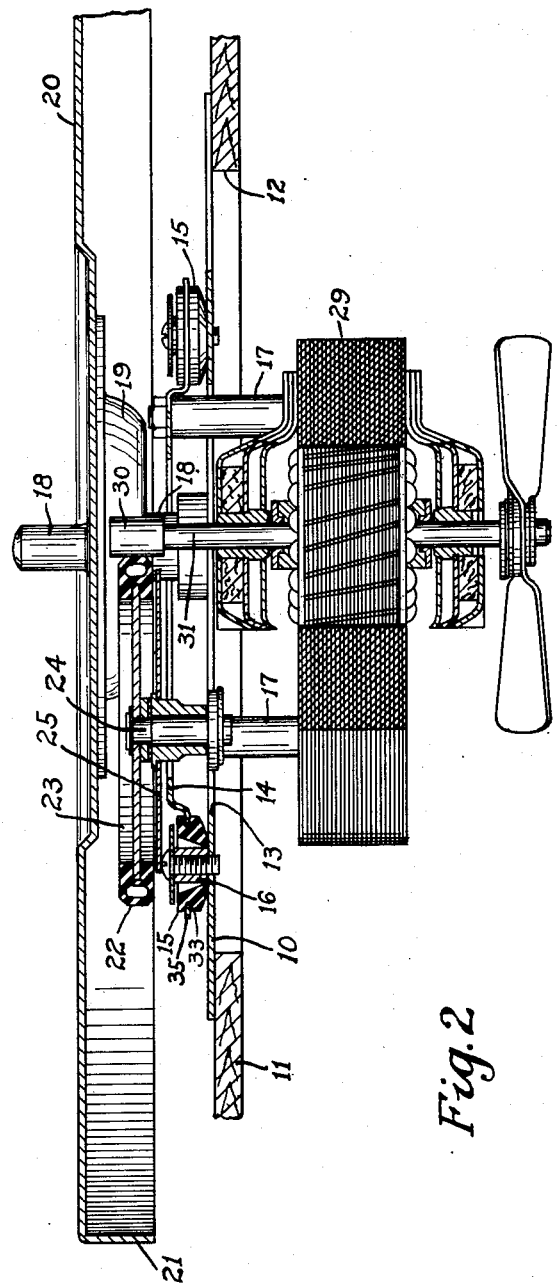
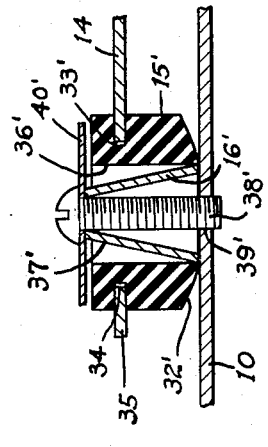
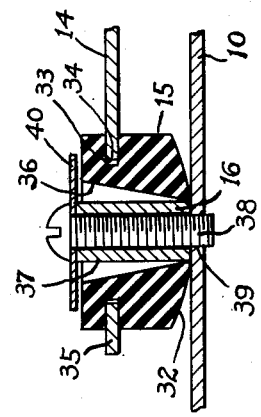
Inventor
*Emmor V. Schneider*
By *Frease and Bishop*
Attorneys Patented Dec. 14, 1948

2,456,087

UNITED STATES PATENT OFFICE 2,456,087

RUBBER GROMMET

Emmor V. Schneider, Alliance, Ohio, assignor to The Alliance Manufacturing Company, Alliance, Ohio, a corporation of Ohio Application November 15, 1944, Serial No. 563,575

15 Claims. (Cl. 248—358)

The invention relates to rubber grommets for isolating vibration of any vibrating element from its support, and the invention is illustrated and described herein as applied to a motor turntable drive for phonograph.

In the application of small electric motors to phonograph turntable drives, one of the chief problems is vibration produced by the motor and reproduced through the loud speaker. This vibration which is caused by the motor is very troublesome and annoying because of the fact that the vibration is picked up by the pickup arm of the phonograph and amplified in the audio amplifier connected to the loud speaker from which it issues in the form of a rumble or hum, the rumble being caused by the rotation of the motor and the hum being caused by the 60 cycle current in the field of the motor.

Owing to the fact that there are two magnetic impulses for each cycle of the 60 cycle alternating current passing through the field of the motor, the resultant hum on the motor supporting plate and turntable, which is picked up by the pickup arm, is at a frequency of 120 cycles, while the rumble or flutter is at the frequency of the rotor. As an illustration, in the case of a rotor revolving at 3000 R. P. M. the rumble or flutter would be at a frequency of 50 cycles.

In an effort to isolate the vibration of the motor from the motor supporting plate and turntable it is customary to use rubber, ordinarily plain rubber grommets, such as commonly used for protecting the cord in an electric device, being generally used in present practice.

It is also common practice to place a metal tubular spacer through the opening in the grommet and to place a washer over the top of the spacer, the entire assembly held in place by means of a screw. This construction has a tendency to some extent to absorb or isolate the vibration of the motor from the motor supporting plate and the turntable but since the tubular spacer usually seals the opening through the grommet almost completely the vibration is conducted through the spacer to the motor supporting plate because of the fact that the rubber is under compression.

The object of the present invention is to provide a novel form of rubber grommet which will substantially completely absorb or isolate the vibration of the motor from the motor supporting plate so that the vibration is not picked up by the pickup arm and thus is not reproduced through the loud speaker in the form of a rumble or hum.

It is another object of the invention to provide a rubber grommet having an axial opening therethrough and a tubular spacer located therein, the axial opening and tubular spacer being so formed that they will contact only at one end so as to leave a clearance between the spacer and the inner wall of the grommet and allow for freedom of motion.

Another object is to provide a rubber grommet having a downwardly tapered central opening therethrough so as to provide for centering action for alignment of the motor and supporting plate and still allow freedom of motion of the motor supporting plate without maintaining the rubber grommet in compression.

A further object is to provide a rubber grommet the lower exterior portion of which, where the support actually takes place, being of conical or convex shape so that the only area of support is right around the lower end of the spacer, thus allowing the motor supporting plate to vibrate freely without causing the rubber grommet to be under compression at any time.

A still further object of the invention is to provide a modified form of the rubber grommet having a straight opening therethrough and a tapered tubular spacer located therein, the lower end of the grommet being conical so as to allow more freedom of vibration without compressing the rubber.

Still another object is to provide a grommet of the character referred to having a peripheral groove within which the motor supporting plate is supported.

A further object is to provide a rubber grommet of the character referred to in which there is a clearance between the grommet and the tubular spacer at all points within the central opening of the grommet excepting at the bottom thereof.

The above objects together with others which will be apparent from the drawing and following description, or which may be later referred to, may be attained by constructing the improved rubber grommet in the manner illustrated in the accompanying drawings in which Figure 1 is a fragmentary top plan view of a phonograph turntable drive showing the improved grommet applied thereto;

Fig. 2 is a vertical sectional view through the turntable drive shown in Fig. 1;

Fig. 3 an enlarged vertical sectional view through the improved grommet and the spacer, and;

Fig. 4 a similar view of a slightly modified form of the grommet.

The improved grommet to which the invention pertains is illustrated as applied to a phonograph motor and in Figs. 1 and 2, a phonograph turntable drive is illustrated.

The turntable operating mechanism is moved together as a unit upon a base plate 10 adjusted to be fastened upon and secured to the platform 11 of the phonograph cabinet or other support for the phonograph as indicated generally in Fig. 2, occupying a position over the opening 12 in the platform.

The base plate 10 is provided with an opening 13 through which the motor is mounted, the motor supporting plate 14 being mounted and spaced above the base plate 10 and over the opening 13 therein, by means of the improved rubber grommets, indicated generally at 15 and provided with spacers 16.

A plurality of depending posts 17 are fixed to the motor mounting plate 14 and extend downwardly through the opening 13 in the base plate, the motor, indicated generally at 29, being connected to the lower ends of said posts whereby the motor is suspended from the motor mounting plate 14.

A post 18 extends upwardly from the base plate 10, in which the post may be journaled in any well known manner, and the hub 19 of the turntable 20 may be fitted thereover so that the turntable is free to rotate thereon.

The turntable has the usual depending peripheral flange 21, the inner face of which is adapted to be frictionally engaged by the friction tread 22 of the idler wheel 23, which is shown as journaled about the stud 24 carried by the movable plate 25, which is mounted for swinging or sliding movement above the motor mounting plate 14.

For the purpose of urging the friction tread 22 of the idler wheel into frictional contact with the rim 21 of the turntable, a spring 26 may be connected to one side of the sliding plate 25, as indicated at 27, and to the adjacent edge of the motor mounting plate 14, as at 28.

A small drive pulley 30 is fixed upon the upper end of the motor shaft 31, and is frictionally engaged by the tread 22 of the idler wheel 23 for driving the turntable 20 when the idler wheel is held in contact with the pulley 30 and turntable rim flange 21, as shown in Fig. 1.

All of the above described apparatus is more or less common under present practice and in itself forms no part of the present invention which is concerned with the construction and arrangement of the rubber grommets 15 by means of which the vibration of the motor is isolated from the base plate and turntable thus preventing reproduction of the vibration through the pickup arm.

Each of these grommets is formed of resilient rubber, or the like, and as shown in detail in Fig. 3 is of substantially cylindrical shape with a conical or convex lower end as indicated at 32. Near its upper end the grommet has a peripheral groove 33, and in these grooves are received the openings 34 in the ears 35 formed upon the motor mounting plate 14.

An axial opening 36 is located entirely through the grommet and may be tapered toward the lower end as shown in Fig. 3, and a tubular spacer, which may be of cylindrical shape as shown at 37 in said figure, is located through said opening and is of slightly greater height than the grommet so that the upper end of the spacer extends slightly above the top of the grommet.

The lower end of the tubular spacer, which is the only portion thereof contacting the grommet, fits within the lower restricted end of the tapered opening 36, and is clamped against the top of the base plate 10 by means of a screw 38 threaded into the tapped opening 39 in the base plate, a washer 40 being located between the top of the tubular spacer 37 and the head of the screw 38 and spaced slightly above the top of the grommet.

The only area of support is at the conical lower extremity of the grommet immediately around the lower end of the spacer, as clearly shown in Fig. 3, and thus more freedom of vibration is permitted without compressing the rubber.

It has been found by actual use that this is a very effective means of isolating the motor vibration from the motor supporting plate and the turntable. It is also a well known fact that rubber in shear does a considerably better job of isolating vibration than rubber in compression.

An examination of the improved grommet in action shows that all of the compression takes place in the conical lower extremity of the grommet where the same contacts the base of the tubular spacer, forming a hinge or fulcrum for the rest of the grommet to vibrate around, and at the same time providing complete centering action for alignment of the motor and support.

As shown in Fig. 4, the same result may be obtained by using a tapered tubular spacer 37' with a straight opening 36' in the rubber grommet 15', which is otherwise the same as the grommet 15 shown in detail in Fig. 3.

The conical lower end 32' of the grommet 15' rests upon the base plate 10, and the large, lower end of the spacer 16' contacts the interior of the grommet only at the lower end of the straight opening 36', so that the action is exactly the same as above described in connection with the form of the invention shown in Fig. 3.

The opening 34, in the ear 35 of the motor mounting plate 14, is received in the annular groove 33' of the grommet 15', and the upwardly tapered spacer 37' extends a slight distance above the top of the grommet 15' and is attached to the base plate 10 by the screw 38' threaded into the tapped opening 39' in the base plate, a washer 40' being located between the top of the spacer 37' and the head of the screw 38', all in the same arrangement and relation as shown and described in connection with Fig. 3, so that the invention may be carried out in identically the same manner with either form thereof.

It has been found in actual use of the improved grommet that the same is a very simple inexpensive and efficient means of properly isolating vibration of the motor from the motor board and turntable platter and preventing it from being reproduced by the pickup arm.

This very simple expedient of shaping the grommet properly for vibration isolation is a very tangible advancement in the phonomotor problem, and gives the same effect as many of the well known, expensive molded and rubber shear principles that are on the market, but at a considerably lower cost, which is a very important consideration in phonomotor construction.

From the above it will be apparent that the present invention solves one of the chief problems in small electric driven phonograph turntables, isolating or absorbing the troublesome and annoying vibration of the motor and preventing its being picked up by the pickup arm and amplified in the loud speaker in the form of a rumble or hum.

Although the invention has been illustrated and described herein as applied to an electric motor turntable drive for phonographs, it should be understood that this is merely to show one use of the improved grommet for isolating vibration and that the improved vibration isolating grommet may be used in any place where it is necessary or desirable to isolate vibration of a vibrating element from the stationary support therefor.

The improved grommet is applicable to many devices in which the vibrating element need not be an electric motor and the stationary supporting element need not be a base plate. This type of mounting may be used for almost any piece of equipment or machinery to isolate or absorb the vibration thereof, an entire machine being the vibrating element and the floor or other rigid structure being the stationary supporting element upon which the machine may be mounted by means of the improved grommets, without any change in the construction or arrangement of the grommets except that they may be larger or smaller as the occasion may require.

As another example of an application of the invention, the improved grommet may be used for isolating vibration from various machine elements, for instance, a radio set chassis may be mounted in the cabinet with the improved rubber grommets so as to isolate the vibration of the radio set chassis from the supporting cabinet.

Or an automobile motor may be mounted upon the chassis frame by means of the improved grommets, so as to isolate the vibration of the motor from the automobile frame and body.

It will thus be apparent that the invention resides in the construction and arrangement of the improved rubber grommets per se, regardless of the device to which it may be applied for isolating or absorbing vibration of a vibrating element.

According to the provisions of the patent statutes I have explained the principle of my invention and have illustrated and described in detail one embodiment thereof, but I desire to have it understood that within the scope of the appended claims the invention may be practiced otherwise than as specifically illustrated and described, the invention residing in the construction and arrangement of the improved rubber grommet for isolating vibration from any vibrating element to its stationary support

I claim:

1. A rubber grommet for mounting a vibrating element upon a support and isolating vibration of the vibrating element from the support, said rubber grommet being arranged for connection to the vibrating element and the lower end of the grommet being arranged to rest upon the support, there being an axial opening through the grommet and a spacer located through said axial opening for attachment to the support, the spacer and axial opening being so shaped that the only point of contact between the spacer and the grommet is at the lower end of said axial opening and the lower end of the grommet being convex so that the only point of contact between the grommet and the support is at the center of the lower end of the grommet surrounding said axial opening.

2. A rubber grommet for mounting a vibrating element upon a support and isolating vibration of the vibrating element from the support, said rubber grommet being arranged for connection to the vibrating element and the lower end of the grommet being arranged to rest upon the support, there being an axial opening through the grommet and a spacer located through said axial opening for attachment to the support, said axial opening being downwardly tapered so that the only point of contact between the spacer and the grommet is at the lower end of said axial opening and the lower end of the grommet being convex so that the only point of contact between the grommet and the support is at the center of the lower end of the grommet surrounding said axial opening.

3. A rubber grommet for mounting a vibrating element upon a support and isolating vibration of the vibrating element from the support, said rubber grommet being arranged for connection to the vibrating element and the lower end of the grommet being arranged to rest upon the support, there being an axial opening through the grommet and a spacer located through said axial opening for attachment to the support, said spacer being upwardly tapered so that the only point of contact between the spacer and the grommet is at the lower end of said axial opening and the lower end of the grommet being convex so that the only point of contact between the grommet and the support is at the center of the lower end of the grommet surrounding said axial opening.

4. A rubber grommet for mounting a vibrating element upon a support and isolating vibration of the vibrating element from the support, said rubber grommet having a peripheral groove for connection to the vibrating element and the lower end of the grommet being arranged to rest upon the support, there being an axial opening through the grommet and a spacer located through said axial opening for attachment to the support, the spacer and axial opening being so shaped that the only point of contact between the spacer and the grommet is at the lower end of said axial opening and the lower end of the grommet being convex so that the only point of contact between the grommet and the support is at the center of the lower end of the grommet surrounding said axial opening.

5. A rubber grommet for mounting a vibrating element upon a support and isolating vibration of the vibrating element from the support, said rubber grommet having a peripheral groove for connection to the vibrating element and the lower end of the grommet being conical and arranged to rest upon the support, there being an axial opening through the grommet and a spacer located through said axial opening for attachment to the support, said axial opening being downwardly tapered so that the only point of contact between the spacer and the grommet is at the lower end of said axial opening the only point of contact between the grommet and the support being at the center of the bottom of the grommet surrounding said axial opening.

6. A rubber grommet for mounting a vibrating element upon a support and isolating vibration of the vibrating element from the support, said rubber grommet being arranged for connection to the vibrating element, and the lower end of the grommet being arranged to rest upon the support, there being an axial opening through the grommet and a spacer located through said axial opening for attachment to the support, the spacer and axial opening being so shaped that the only point of contact between the spacer and the grommet is at one end of said axial opening and the lower end of the grommet being convex so that the only point of contact between the grommet and the support is at the center of the lower end of the grommet surrounding said axial opening.

7. A rubber grommet for mounting a vibrating element upon a support and isolating vibration of the vibrating element from the support, said rubber grommet being arranged for connection to the vibrating element, and the lower end of the grommet being arranged to rest upon the support, there being an axial opening through the grommet and a spacer located through said axial opening for attachment to the support, said axial opening being reduced in diameter at one end so that the only point of contact between the spacer and the grommet is at said reduced end of said axial opening and the lower end of the grommet being convex so that the only point of contact between the grommet and the support is at the center of the lower end of the grommet surrounding said axial opening.

8. A rubber grommet for mounting a vibrating element upon a support and isolating vibration of the vibrating element from the support, said rubber grommet being arranged for connection to the vibrating element, the lower exterior portion of the grommet being conical, and the lower end of the grommet being arranged to rest upon the support, there being an axial opening through the grommet and a spacer located through said axial opening for attachment to the support, said axial opening being reduced in diameter at one end so that the only point of contact between the spacer and the grommet is at said reduced end of said axial opening the only point of contact between the grommet and the support being at the center of the bottom of the grommet surrounding said axial opening.

9. A rubber grommet for mounting a vibrating element upon a support and isolating vibration of the vibrating element from the support, said rubber grommet being arranged for connection to the vibrating element, and the lower end of the grommet being arranged to rest upon the support, there being an axial opening through the grommet and a spacer located through said axial opening for attachment to the support, said spacer being enlarged in diameter at one end so that the only point of contact between the spacer and the grommet is at said enlarged end of the spacer and the lower end of the grommet being convex so that the only point of contact between the grommet and the support is at the center of the lower end of the grommet surrounding said axial opening.

10. A rubber grommet for mounting a vibrating element upon a support and isolating vibration of the vibrating element from the support, said rubber grommet being arranged for connection to the vibrating element, the lower exterior portion of the grommet being conical, and the lower end of the grommet being arranged to rest upon the support, there being an axial opening through the grommet and a spacer located through said axial opening for attachment to the support, said spacer being enlarged in diameter at one end so that the only point of contact between the spacer and the grommet is at said enlarged end of the spacer the only point of contact between the grommet and the support being at the center of the bottom of the grommet surrounding said axial opening.

11. A rubber grommet for mounting a vibrating element upon a support and isolating vibration of the vibrating element from the support, said rubber grommet being arranged for connection to the vibrating element and the lower end of the grommet being arranged to rest upon the support, there being an axial opening through the grommet and a spacer of slightly greater length than the grommet located through the axial opening and terminating a short distance above the top of the grommet, a washer fixed to the upper end of the spacer and spaced slightly from the top of the grommet, the spacer and axial opening being so shaped that the only point of contact between the spacer and the grommet is at one end of the axial opening, and the lower end of the grommet being convex so that the only point of contact between the grommet and the support is at the center of the lower end of the grommet surrounding said axial opening.

12. A rubber grommet for mounting a vibrating element upon a support and isolating vibration of the vibrating element from the support, said rubber grommet being arranged for connection to the vibrating element and the lower end of the grommet being arranged to rest upon the support, there being an axial opening through the grommet and a spacer of slightly greater length than the grommet located through the axial opening and terminating a short distance above the top of the grommet, a washer fixed to the upper end of the spacer and spaced slightly from the top of the grommet, said axial opening being reduced in diameter at one end so that the only point of contact between the spacer and the grommet is at said reduced end of said axial opening, and the lower end of the grommet being convex so that the only point of contact between the grommet and the support is at the center of the lower end of the grommet surrounding said axial opening.

13. A rubber grommet for mounting a vibrating element upon a support and isolating vibration of the vibrating element from the support, said rubber grommet being arranged for connection to the vibrating element and the lower end of the grommet being arranged to rest upon the support, there being an axial opening through the grommet and a spacer of slightly greater length than the grommet located through the axial opening and terminating a short distance above the top of the grommet, a washer fixed to the upper end of the spacer and spaced slightly from the top of the grommet, said spacer being enlarged in diameter at one end so that the only point of contact between the spacer and the grommet is at said enlarged end of the spacer, and the lower end of the grommet being convex so that the only point of contact between the grommet and the support is at the center of the lower end of the grommet surrounding said axial opening.

14. A rubber grommet for mounting a horizontal vibrating element upon a horizontal support and isolating vibration of the vibrating element from the support, said grommet being connected to the vibrating element and the lower end of the grommet resting by gravity only upon the support, there being an axial opening through the grommet and a vertical spacer of slightly greater length than the grommet located through the axial opening and terminating a short distance above the top of the grommet, a washer fixed to the upper end of the spacer, said washer being of larger diameter than the axial opening in the grommet and being spaced slightly above the top of the grommet, the spacer and axial opening being so shaped that the only point of contact between the spacer and the grommet is at the lower end of the axial opening, and the lower end of the grommet being convex so that the only point of contact between the grommet and the support is at the center of the lower end of the grommet surrounding the axial opening.

15. A rubber grommet for mounting a horizontal vibrating element upon a horizontal support and isolating vibration of the vibrating element from the support, said grommet being connected to the vibrating element and the lower end of the grommet resting by gravity only upon the support, there being an axial opening through the grommet and a vertical spacer of slightly greater length than the grommet located through the axial opening and terminating a short distance above the top of the grommet, a washer fixed to the upper end of the spacer, said washer being of larger diameter than the axial opening in the grommet and being spaced slightly above the top of the grommet, said axial opening being reduced in diameter at its lower end so that the only point of contact between the spacer and the grommet is at the lower end of the axial opening, and the lower end of the grommet being convex so that the only point of contact between the grommet and the support is at the center of the lower end of the grommet surrounding the axial opening.

EMMOR V. SCHNEIDER.

REFERENCES CITED

The following references are of record in the file of this patent:

UNITED STATES PATENTS

| Number | Name | Date |
| --- | --- | --- |
| 1,602,922 | Midboe | Oct. 12, 1926 |
| 1,929,092 | Diehl et al. | Oct. 3, 1933 |
| 2,241,138 | Julien | May 6, 1941 |
| 2,261,889 | Schneider | Nov. 4, 1941 |
| 2,340,629 | Trier | Feb. 1, 1944 |
| 2,353,945 | Storch | July 18, 1944 |
| 2,379,763 | Sweet et al. | July 3, 1945 |

FOREIGN PATENTS

| Number | Country | Date |
| --- | --- | --- |
| 50,180 | France | Jan. 17, 1940 |
| 524,203 | Great Britain | Aug. 1, 1940 |
| 486,060 | Great Britain | May 30, 1938 |
| 546,454 | Great Britain | July 14, 1942 |